United States Patent Office 3,804,910
Patented Apr. 16, 1974

3,804,910
ISOLATION OF POLYMERIZATION GRADE TETRAFLUOROETHYLENE
Clarence L. Furrow, Bartlesville, Okla., assignor to Phillips Petroleum Company, Bartlesville, Okla.
No Drawing. Continuation-in-part of abandoned application Ser. No. 32,735, Apr. 28, 1970. This application Jan. 13, 1972, Ser. No. 217,670
Int. Cl. C07c 21/18
U.S. Cl. 260—653.3                     8 Claims

ABSTRACT OF THE DISCLOSURE

Tetrafluoroethylene, inhibited for storage or transportation, having a purity of approximately 98 percent is treated by consecutively contacting with sulfuric acid, molecular sieve and pyrophoric copper to produce a tetrafluoroethylene readily polymerizable to a polytetrafluoroethylene of commercial quality. Removal of trace quantities of polymerization inhibiting compounds by passage of treated tetrafluoroethylene through pyrophoric copper produces a tetrafluoroethylene readily polymerizable to commercial quality polytetrafluoroethylene.

BACKGROUND OF INVENTION

This application is a continuation-in-part of application Ser. No. 32,735, filed Apr. 28, 1970, now abandoned.

This invention relates to the purification of tetrafluoroethylene. In one of its aspects, it relates to a method for removal of polymerization inhibiting compounds from tetrafluoroethylene. In another of its aspects, it relates to the removal of trace quantities of polymerization inhibiting compounds from tetrafluoroethylene. In still another of its aspects, it relates to the production of tetrafluoroethylene that can be readily polymerized into commercial molding grade polytetrafluoroethylene.

In one concept of the invention, it provides a method for removing inhibiting compounds from tetrafluoroethylene by contacting the tetrafluoroethylene containing polymerization inhibitors with a series of treating compounds. In another of its concepts, the invention provides for reducing the quantity of polymerization inhibiting compounds present in tetrafluoroethylene by passing tetrafluoroethylene previously treated to reduce inhibiting compound concentration through pyrophoric copper to produce tetrafluoroethylene that can be polymerized to commercial molding grade polytetrafluoroethylene.

Since the attractive qualities of polytetrafluoroethylene occur only at very high molecular weight any impurities capable of end-capping a growing chain or capable of causing chain transfer or otherwise inhibiting chain growth to a very high molecular weight must be rigorously excluded from tetrafluoroethylene which is to be polymerized. The preparation of commercially desirable high molecular weight polymer requires the use of an unusually pure tetrafluoroethylene. It is necessary that tetrafluoroethylene of high purity be used initially in the polymerization because the nonwettable, insoluble nature of polytetrafluoroethylene restricts work-up possibilities. This requirement of initially high purity tetrafluoroethylene has caused the industrial practice of polymerizing uninhibited tetrafluoroethylene because, once inhibited, it has been impractical by previously known methods to subsequently purify tetrafluoroethylene sufficiently for polymerization to commercial quality polytetrafluoroethylene. Up to now closely coordinated monomer and polymer facilities have generally been required. The use of the present invention makes practical the inhibition of tetrafluoroethylene prior to polymerization with a consequent reduction in the hazards of tetrafluoroethylene manipulation and increased flexibility in plant operation.

Various methods for treating tetrafluoroethylene for the removal of impurities are known to the art. U.S. Pat. 3,218,364 teaches the treatment of fluoroolefin monomer with an aqueous solution of sulfuric acid to remove from the monomer those olefinic impurities which tend to decrease the thermal stability of any polymer produced from such a fluoroolefin. U.S. Pat. 3,215,747 teaches that trifluoroethylene can be separated from tetrafluoroethylene by the selective adsorption of the trifluoroethylene on Linde Molecular Sieves Type 10X. A method for removal of oxygen from tetrafluoroethylene by passing a gas over a metallic catalyst, such as copper or nickel, at elevated temperature is disclosed in U.S. Pat. 2,407,405. All of these methods provide for removal of specific compounds, but the exhaustive treatment necessary using any one of these methods makes their use impractical for purification of tetrafluoroethylene to the degree necessary for commercial grade polytetrafluoroethylene production. It has been observed that grossly removing the polymerization inhibitor and impurities present in tetrafluoroethylene by contacting the tetrafluoroethylene with sulfuric acid and then with molecular sieve produces a tetrafluoroethylene stream which can then be raised to the abnormally high tetrafluoroethylene purity required for production of polytetrafluoroethylene of commercial quality by contacting the partially purified stream with pyrophoric copper. This 3-component purification train is effective, economical and dependable. The three stages are necessary because passage of the stream through pyrophoric copper without grossly removing the inhibiting compounds would require impractically large quantities of pyrophoric copper. This invention provides a method for purifying inhibited tetrafluoroethylene to the extent required for production for polytetrafluoroethylene of commercial quality which has until now been unknown to the art.

It is therefore an object of this invention to provide a method for producing tetrafluoroethylene which can be readily polymerized into polytetrafluoroethylene of commercial grade. It is another object of this invention to provide an economical, safe and efficient method for removing polymerization inhibitor from tetrafluoroethylene.

Other aspects, concepts, and objects are apparent from a study of this disclosure and the appended claims.

SUMMARY OF INVENTION

According to the present invention there is provided a method for the removal of polymerization inhibiting compounds from tetrafluoroethylene containing the same, the inhibiting compounds tending otherwise to prevent polymerization of tetrafluoroethylene to the extraordinary molecular weight required to obtain the desirable properties of commercial polytetrafluoroethylene, which comprises treating the tetrafluoroethylene consecutively with sulfuric acid and molecular sieve producing a tetrafluoroethylene stream which is treated by contacting with pyrophoric copper to increase the purity of the tetrafluoroethylene to the level required for production of polytetrafluoroethylene of commercial quality.

In a specific embodiment of the invention tetrafluoroethylene is passed in a stream containing a polymerization inhibiting compound, which may be in the stream inherently from the manner of production of the tetrafluoroethylene or may have been introduced into the stream specifically as an inhibiting agent, through concentrated sulfuric acid and 10X molecular sieve to remove polymerization inhibiting compounds grossly. The thus purified stream is then passed across pyrophoric copper to increase the purity of the tetrafluoroethylene stream to the level required for production of polytetrafluoroethylene of commercial quality.

In accordance with this invention, a stream of tetrafluoroethylene containing polymerization inhibitor is passed from any source, which can be storage or shipment containers or a production source, into contact with sulfuric acid. This contacting can be by bubbling the tetrafluoroethylene through a fixed bath of the acid or countercurrent flow of tetrafluoroethylene through a flow of the acid either with or without a solid material interposed to break up the flow patterns or by any other contacting means assuring intimate contact of the tetrafluoroethylene and the sulfuric acid. The effluent tetrafluoroethylene stream is then passed through a bed of molecular sieve in such a manner that intimate contact between the tetrafluoroethylene and molecular sieve is achieved. The tetrafluoroethylene is then intimately contacted with pyrophoric copper. The contact can be by any of the means already well known. The effluent tetrafluoroethylene is purified of polymerization inhibiting compounds to the degree necessary to produce commercially acceptable polytetrafluoroethylene of commercial molding grade.

Throughout this application polytetrafluoroethylene of commercial quality is defined as material that will meet current ASTM D1457-62T specifications for general purpose molding resin. This specification is outlined below in comparison Table I. Sulfuric acid treatment removes not only side products of tetrafluoroethylene preparation such as trifluoroethylene and difluoroethylene but also terpene hydrocarbon mixtures which are often added to tetrafluoroethylene as polymerization inhibitor. Efficient sulfuric acid scrubbing at the beginning of the purification train will minimize the purification that must be done downstream by molecular sieve and pyrophoric copper thus postponing the need for regenerating these elements of the train. Therefore, a unit consisting of multiple scrubbers in series is more desirable than a single sulfuric acid scrubber. Since the acid darkens with absorption of polymerization inhibiting compounds visual inspection of the acid can be used to determine when it should be replaced. Scrubbers consisting of a means for bubbling tetrafluoroethylene through a body of sulfuric acid can be fitted with a glass frit for tetrafluoroethylene dispersion. Ceramic, glass or other inert substance is the preferred material of construction to preclude possible evolution of hydrogen by contact of the acid with metal.

The tetrafluoroethylene suitable for purification by the method of this invention is the typical monomer of commerce which has a minimum purity of about 98.0 weight percent. Usually present are trace amounts of saturated and unsaturated fluorocarbons and oxygen. A polymerization inhibitor such as limonene is always added in quantities of up to about 1 weight percent to prevent premature polymerization of the tetrafluoroethylene. Among the commercially used polymerization inhibitors for stored or shipped tetrafluoroethylene are trepinolene, alpha-pinene and limonene.

Although a wide range of concentrations of sulfuric acid can be used to treat a tetrafluoroethylene monomer, advantageous results can be obtained using aqueous solutions of sulfuric acid in which the sulfuric acid concentration ranges from 50 to about 98 percent by weight, and preferably in a range from about 90 to about 98 percent by weight.

The type of synthetic zeolite molecular sieves described in U.S. Pats. 2,882,243 and 2,882,244 are particularly suitable for use in this invention. Absorbents of these types are commercially available. Absorbents used in this invention should have pore openings with an effective pore diameter of at least about 5 A. Absorbents with pore openings up to about 10 A have been proved effective. The Linde Molecular Sieve 10X having an effective pore size of about 8 A. has been found to be particularly effective.

The last element of the purification train is a treatment column containing pyrophoric copper. The effectiveness of pyrophoric copper in removing oxygen is well known. Oxygen can inhibit tetrafluoroethylene polymerization in certain concentrations, can promote tetrafluoroethylene polymerization in another range and can form explosive mixtures in certain concentrations with tetrafluoroethylene. The inclusion of pyrophoric copper has an added benefit of assuring the removal of traces of oxygen from a tetrafluoroethylene system. The removal of traces of other compounds capable of inhibiting the production of exceptionally high molecular weight polytetrafluoroethylene could not be accomplished until pyrophoric copper was included in the train, and it is the removal of traces of all inhibiting compounds that permits commercial polytetrafluoroethylene production.

The pyrophoric copper is placed last in the purification train because its very high reactivity make its use for the removal of gross impurities impractical and because its period of effectiveness between regeneration can thus be increased. The catalyst is effective at room temperature and elevation of temperature is required only for activation and regeneration. In a preferred embodiment activated pyrophoric copper catalyst R3–11 made by Badische Anilin & Soda-Fabrik described in their bulletin B 259e 7.60 is used. The pressure at which the purification is accomplished is dependent only on the driving force needed to produce a preferred flow rate. The purification over pyrophoric copper can be accomplished at ambient temperature and initial reaction temperatures from −20° C. to 70° C. are practicable.

The following are specific examples showing the purification of tetrafluoroethylene and its subsequent polymerization.

Example I

Tetrafluoroethylene, as immediately required for polymerization, was purified by passage at a rate of approximately 1.33 g./min. through a 40–55 micron frit into concentrated sulfuric acid, followed by 10X molecular sieve (133 g. in 0.5 inch stainless steel tubing) and finally through Badische R3–11 (32 g. 20/40 mesh in 0.25 inch stainless steel tubing). The purified tetrafluoroethylene was condensed at Dry Ice temperature in a ballast cylinder which was then used, upon removal of cooling, as a supply source for the polymerization reaction.

Example II

Sodium bisulfite (0.00125 g.), potassium persulfate (0.0025 g.), deoxygenated water (500 ml.) and tetrafluoroethylene (190–200 p.s.i.g.) were charged in the absence of air to a stirred, 1-liter autoclave. Polymerization proceeded at 60–65° C. by adding additional tetrafluoroethylene as required to maintain 190–200 p.s.i.g. The polymerization was terminated after 56 min. by venting the autoclave. The polymer (61.2 g.) was vigorously washed with deionized water and dried for 24 hrs. at 100° C./reduced pressure.

The real, best and ultimate test of tetrafluoroethylene monomer purity is the quality of the resulting polytetrafluoroethylene. Although the production of high quality polymer normally necessitates the use of high purity monomer, this is particularly true of polytetrafluoroethylene because of the exceptionally high molecular weights need to afford the properties commercially desirable. The level of polymer quality, therefore, amounts to a more sensitive and exacting test of monomer purity than analytical methods provide. The data presented in Table I below was compiled from samples purified and polymerized as described in the examples above. This data points out the effectiveness of the three stage purification train as compared to purification without the pyrophoric copper purification step.

TABLE I

| Purification train— | | | Density after sintering for 30 min. ASTM D1457-62T | Thermal instability index ASTM D1457-62T | Tensile strength, p.s.i.g. | Elongation, percent |
|---|---|---|---|---|---|---|
| Sulfuric acid | Molecular sieve | R3-11 | | | | |
| Yes | Yes | Yes | 2.176 | 16 | 3,410 | 308 |
| Yes | Yes | Yes | 2.172 | 11 | 2,560 | 210 |
| Yes | Yes | Yes | 2.178 | 11 | 3,220 | 350 |
| Yes | Yes | No | 2.245 | 6 | 1,730 | 30 |
| Specifications ASTM D1457-62T | | | [1] 2.13–[2] 2.18 | [2] 50 | [1] 2,000 | [1] 125 |

[1] Minimum.
[2] Maximum.

In the table below is presented data showing the effectiveness of the purification train particularly in removing limonene, a terpene polymerization inhibitor, added to commercially prepared cylinders of tetrafluoroethylene. Since the effectiveness of the purification train declines with use, the following values do not represent the optimum because the purification train was not freshly activated when the samples were taken. These values are, however, typical of average conditions.

TABLE II

| Concentration, p.p.m.[1] | | | | Limonene[3] | Sample source |
|---|---|---|---|---|---|
| TFE | $C_2F_3H$ | Y[2] | Cyclo-$C_4F_8$ | | |
| [4] 99.8 | 1.83 | 1.36 | 2,240 | 470 | Cylinder. |
| [4] 99.8 | 0 | 0 | 2,160 | 0 | Purification train exit. |

[1] Normalized to MM p.p.m. (limonene not determined) obtained by "Aerograph 1520" analysis.
[2] Unidentified.
[3] Conc., p.p.m. obtained in independent sample.
[4] Rounded off to nearest tenth.

Reasonable variation and modification are possible within the scope of the foregoing disclosure and the appended claims to the invention, the essence of which is that there has been provided a method for effectively reducing the level of polymerization inhibiting compounds in a tetrafluoroethylene monomer stream by contacting the monomer in a three-stage purification train successively with concentrated sulfuric acid and molecular sieve to produce a monomer stream which is then contacted with pyrophoric copper to produce a monomer of sufficient purity to readily polymerize into polytetrafluoroethylene of commercial molding grade.

I claim:
1. A method for treating tetrafluoroethylene comprising successively intimately contacting tetrafluoroethylene with an aqueous solution of at least 50 percent sulfuric acid, molecular sieve having an effective pore diameter of at least 5 A. and pyrophoric copper thereby removing polymerization inhibiting compounds.

2. The method of claim 1 wherein tetrafluoroethylene of about 98 weight percent purity is contacted successively with said sulfuric acid and said molecular sieve whereby polymerization inhibiting compounds are grossly removed and said tetrafluoroethylene is then contacted with pyrophoric copper to remove trace quantities of said polymerization inhibiting compounds.

3. The method of claim 1 wherein the initial reaction temperature of the tetrafluoroethylene and the pyrophoric copper is in the range of about −20° C. to about 70° C.

4. The method of claim 3 wherein purification is accomplished at ambient temperature.

5. The method of claim 3 wherein the concentration of sulfuric acid is in the range of about 50 to about 98 percent by weight and the pore diameters of the molecular sieves are about 5 A to about 10 A.

6. The method of claim 2 wherein the concentration of sulfuric acid is in the range of about 50 to about 98 percent by weight and the pore diameters of the molecular sieves are about 5 A to about 10 A.

7. The method of claim 5 wherein the concentration of the sulfuric acid is in the range of about 90 to about 98 percent by weight and the pore diameters of the molecular sieves are about 8 A.

8. The method of claim 6 wherein the concentration of sulfuric acid is in the range of about 90 to about 98 percent by weight and the pore diameters of the molecular sieves are about 8 A.

References Cited

UNITED STATES PATENTS 2,917,556   12/1959   Percival _____ 260—653.3
3,215,747   11/1965   Fainberg et al. _____ 260—653.3
3,218,364   11/1965   Kometani et al. ____ 260—653.3

DANIEL D. HORWITZ, Primary Examiner